United States Patent [19]

Dickenson

[11] 4,414,540

[45] Nov. 8, 1983

[54] AUTOMATIC REDUNDANT TRANSDUCER SELECTOR FOR A STEAM TURBINE CONTROL SYSTEM

[75] Inventor: Royston J. Dickenson, Scotia, N.Y.

[73] Assignee: General Electric Company, Schenectady, N.Y.

[21] Appl. No.: 280,672

[22] Filed: Jul. 6, 1981

[51] Int. Cl.³ ............................................. G08B 21/00
[52] U.S. Cl. .................................. 340/508; 340/511; 340/653
[58] Field of Search ............... 340/635, 519, 523, 522, 340/511, 517, 653, 508

[56] References Cited

U.S. PATENT DOCUMENTS

| | | | |
|---|---|---|---|
| 3,228,002 | 1/1966 | Reines | 340/519 |
| 3,247,498 | 4/1966 | Sadvary et al. | 340/519 |
| 4,063,228 | 12/1977 | Eggenberger et al. | 340/523 X |

*Primary Examiner*—John W. Caldwell, Sr.
*Assistant Examiner*—Daniel Myer
*Attorney, Agent, or Firm*—Robert C. Kain, Jr.; John F. Ahern

[57] ABSTRACT

For use in combination with a turbine control system, an automatic signal selector to assure selection of a valid signal representation of an operating parameter of the controlled turbine. Redundant sensors provide multiple redundant signals representing the operating parameter. Each signal is applied to a corresponding range detection circuit which generates an alarm signal whenever the sensor signal is higher or lower than preselected values. Simultaneously, each sensor signal and each alarm signal is applied to a selector network which selects one of the sensor signals as a valid signal for turbine control purposes. Thus, if any one of the alarm signals is present, indicating that at least one sensor signal is outside the preselected range, the highest valued sensor signal is automatically selected for control purposes. On the other hand, if no alarm signals are present, the control signal is automatically selected to be an intermediate valued one of the sensor signals. A protective action signal is generated in the event all sensor signals are outside the preselected range of values.

10 Claims, 4 Drawing Figures

4,414,540

AUTOMATIC REDUNDANT TRANSDUCER SELECTOR FOR A STEAM TURBINE CONTROL SYSTEM

BACKGROUND OF THE INVENTION

This invention pertains generally to automatic control systems for steam turbines and in particular to apparatus for insuring the utmost reliability in signals which are generated as representative of turbine operating parameters and which serve as inputs to a turbine control system.

It is an elementary proposition that control systems for large steam turbines are based upon some continuously measured operating parameter of the turbine. For example, in the ubiquitous speed control system it is obvious that some actual speed responsive means must be provided to continuously inform the attendant controller of any need for corrective action. It becomes apparent then, regardless of which particular variable is under control, that the reliability of the signals representing the measured quantity is of critical importance if the turbine is to be properly controlled.

One conventional method of improving control signal reliability is to use multiple redundant sensing devices so that, by judicious choice on the part of operating personnel, at least one sensor is always available for control.

However, in many cases, particularly in steam pressure control loops, it often becomes necessary, because of sensor failure, for the operator to rely upon manual control. This, of course, requires continuous close attention on the part of the operator during the period of manual control with the result that pressure control is not as effective as is frequently desired.

With the current interest in operating steam turbines in the steam bypass mode, the importance of achieving good automatic control of the main and reheated steam pressures has assumed increased importance. Generally, in this mode of operation control of the bypass valving is intimately related to measurements of these steam parameters. For example, in U.S. Pat. No. 4,253,308 to Eggenberger et al. a bypass control system is disclosed in which fundamental control decisions are based on measurements of the main and reheated steam pressures. Further, in U.S. Pat. No. 4,357,803 filed in the name of the present inventor and of common assignee with the present invention, a comprehensive bypass control system is disclosed which relies upon the fundamental pressure measurement to the extent that manual/automatic control (M/A) means are entirely eliminated from the bypass control loops. If such reliance is not to be misplaced, extraordinary measures are required in these pressure control systems to guard against loss of the input pressure signals. Perhaps more damaging, there is the possibility of basing the control decisions on an incorrect measurement of the steam pressure.

Accordingly, it is an object of the present invention to provide apparatus which assures reliability of the signal representing a controlled variable in the operation of a large steam turbine.

Another, more particular object of the invention is to provide an automatic signal selector for assuring selection of a valid signal representation of steam pressure for utilization by a turbine control system wherein steam pressure is a controlled parameter.

Other objects and advantages of the invention will be apparent from the following description of a preferred form of the invention and its operation.

SUMMARY OF THE INVENTION

In a preferred embodiment of the invention for a steam turbine control system wherein steam pressure is a controlled parameter, redundant pressure transducers or sensors provide multiple signals, each representing the steam pressure at a particular location in the steam path. For example, in a steam turbine bypass system the controlled pressure may be the main supply steam pressure. Each pressure signal thus produced is applied to a corresponding range detection circuit which generates an alarm signal whenever the pressure signal is either higher or lower than corresponding preselected high and low set point values representing maximum and minimum acceptable values of steam pressure. Simultaneously, each pressure signal and each alarm signal is applied to a selector network which is operative to select one of the pressure signals as a valid indication of steam pressure depending on the status of the alarm signals. Thus, if any one of the alarm signals is present, indicating that at least one pressure signal is outside the preselected range, the highest valued pressure signal (which is nevertheless within the preselected range) is automatically selected for control purposes. On the other hand, if no alarm signals are presented to the selector network, the control signal is automatically selected to be a pressure signal having a value intermediate to the highest and lowest pressure signals. Additionally, a turbine protection network, responsive to the various alarm signals, provides a protective action signal which may be used to automatically shut the turbine down or to initiate other appropriate action in the event all pressure signals are outside the preselected range of pressure values.

BRIEF DESCRIPTION OF THE DRAWINGS

While the specification concludes with claims particularly pointing out and distinctly claiming the subject matter regarded as the invention, the invention will be better understood from the following description taken in connection with the accompanying drawings in which:

DETAILED DESCRIPTION OF THE INVENTION

Figure 1:
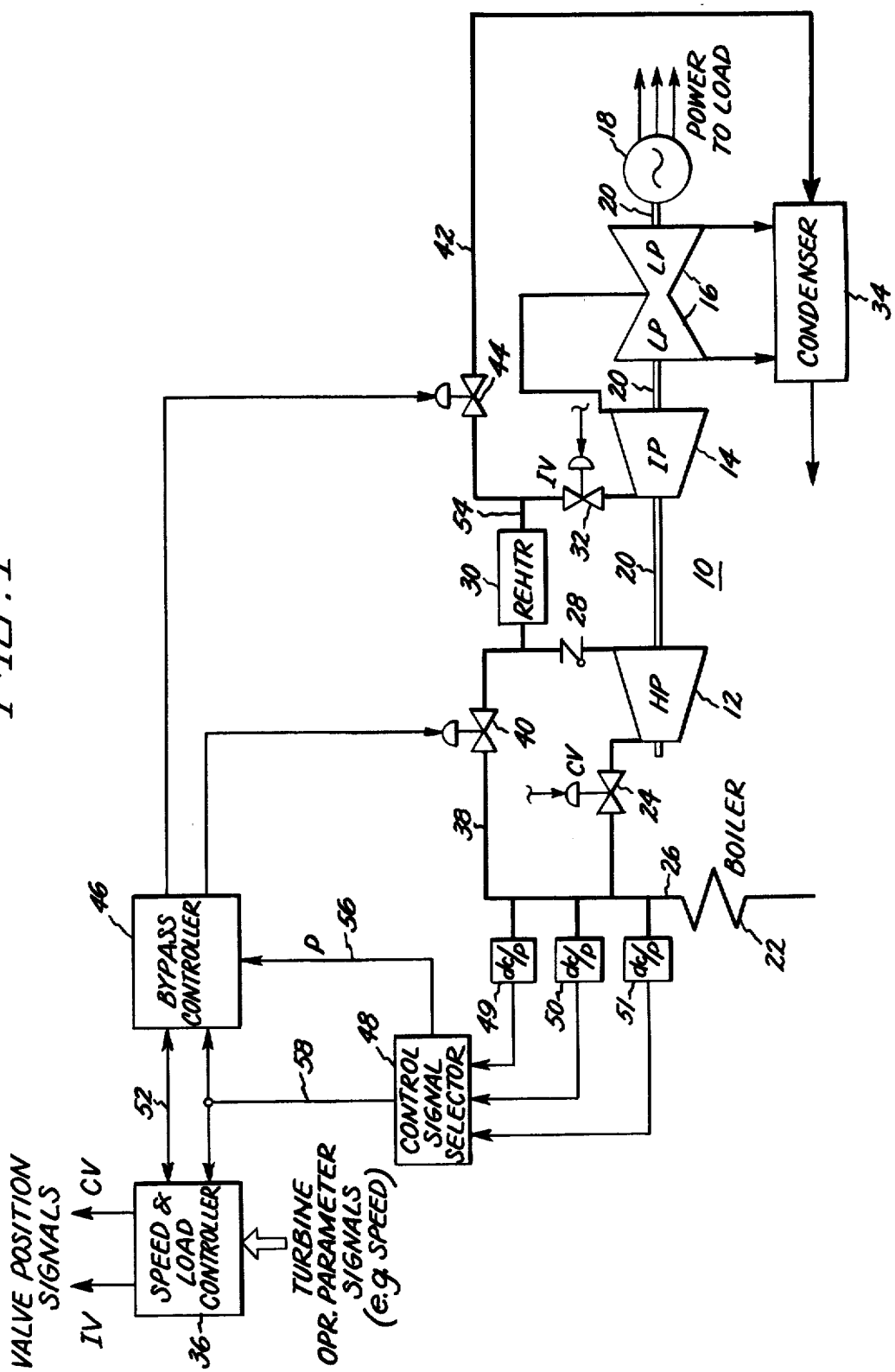
FIG. 1 is a simplified schematic diagram illustrating the invention within the context of a steam turbine bypass control system and showing interconnections between the control signal selector of a preferred form of the invention and related turbine control loops.

FIG. 1 is a greatly simplified schematic illustration of a steam turbine power plant in which steam bypass routes are provided around both the high and lower pressure sections of the turbine. This mode of operation has received recent renewed interest in this country for a variety of reasons as set forth in the previously mentioned documents, U.S. Pat. Nos. 4,253,308 and 4,357,803 whose disclosures are incorporated herein by reference. While operation of the turbine is not entirely material to the invention, it will facilitate an understanding of the invention to briefly describe the turbine and the steam bypass system operation.

The turbine 10 comprises a high pressure (HP) section 12, and intermediate pressure (IP) section 14, and lower pressure (LP) sections 16 which may be tandemly coupled to each other and to electrical generator 18 through a shaft 20 as illustrated. This is a common configuration for a large steam turbine utilized to produce electrical power.

Steam under pressure, generated by boiler 22, first enters the HP section 12 of the turbine 10 through admission control valve 24 from a steam conduit 26. The exhausted steam from the HP section 12 passes through a check valve 28 (which prevents the reverse flow of steam), through a reheater 30 which restores a high enthalpy value to the steam, and then through an intercept valve 32 to IP section 14 and LP sections 16. The exhausted steam finally passes to a condenser 34 from which water is recycled to the boiler 22. Each section 12, 14, and 16 of the turbine 10 extracts energy from the steam imparting rotary motion to the shaft 20, ultimately resulting in electrical power produced by generator 18.

The turbine speed and load are determined by steam pressure and temperature, and by the rate of steam admission to the turbine. The latter parameter is directly controlled by positioning the control valve 24 and the intercept valve 32. These valves are basically under the control of a speed and load controller, generally indicated at 36. Detailed operation of speed and load controller 36 is not material to the present invention and it is sufficient to note that controller 36 accepts signals indicative of turbine performances (e.g., shaft speed, main and reheat steam pressures) and provides corrective action to maintain the turbine at preselected load and speed operating points.

The turbine bypass system (herein greatly simplified) comprises an HP bypass line 38 including HP bypass valve 40; and LP bypass line 42 including LP bypass valve 44; bypass controller 46; and control signal selector 48 including multiple pressure sensors 49-51. The bypass system functions to bypass excess steam around the turbine, directly to the condenser 34, when the turbine is supporting a relatively small load and the boiler 22 is generating more steam than the turbine 10 can utilize. Operation of the bypass valves 40 and 44 is coordinated with operation of the turbine and, accordingly, bypass controller 46 and speed and load controller 36 interact with each other as indicated by signal line 52 interconnecting the two controllers.

Fundamentally, however, bypass controller 46 is a pressure control system directing the position of bypass valves 40 and 44 to maintain described pressure levels in the main steam pressure from the boiler 22 and the reheated steam pressure from reheater 30. As a practical matter, since reheated steam pressure in steam conduit 54 is controlled, pressure transducers and a signal selector corresponding to transducers 49-51 and signal selector 48 would be required to sense the pressure in conduit 54. This additional sensing and control apparatus is omitted from FIG. 1 for simplification since they are not necessary for an understanding of the invention. It is important to note, however, that pressure control and operation of the bypass system depends, to a large extent, upon the validity of the pressure signal representing the controlled pressure. It is the function of control signal selector 48 and pressure transducers 49-51 to minimize the risk that bypass controller 46 will receive an invalid indication of steam pressure by selecting a valid signal representative of the steam pressure and applying this signal at the output of selector 48. Further, in the event all redundantly provided signals are invalid, control signal selector 48 provides a turbine protection signal to speed and load controller 36 and to bypass controller 46 triggering these controllers to take action protective of the turbine. The pressure signal is provided along line 56; the protection signal along line 58.

Figure 2:
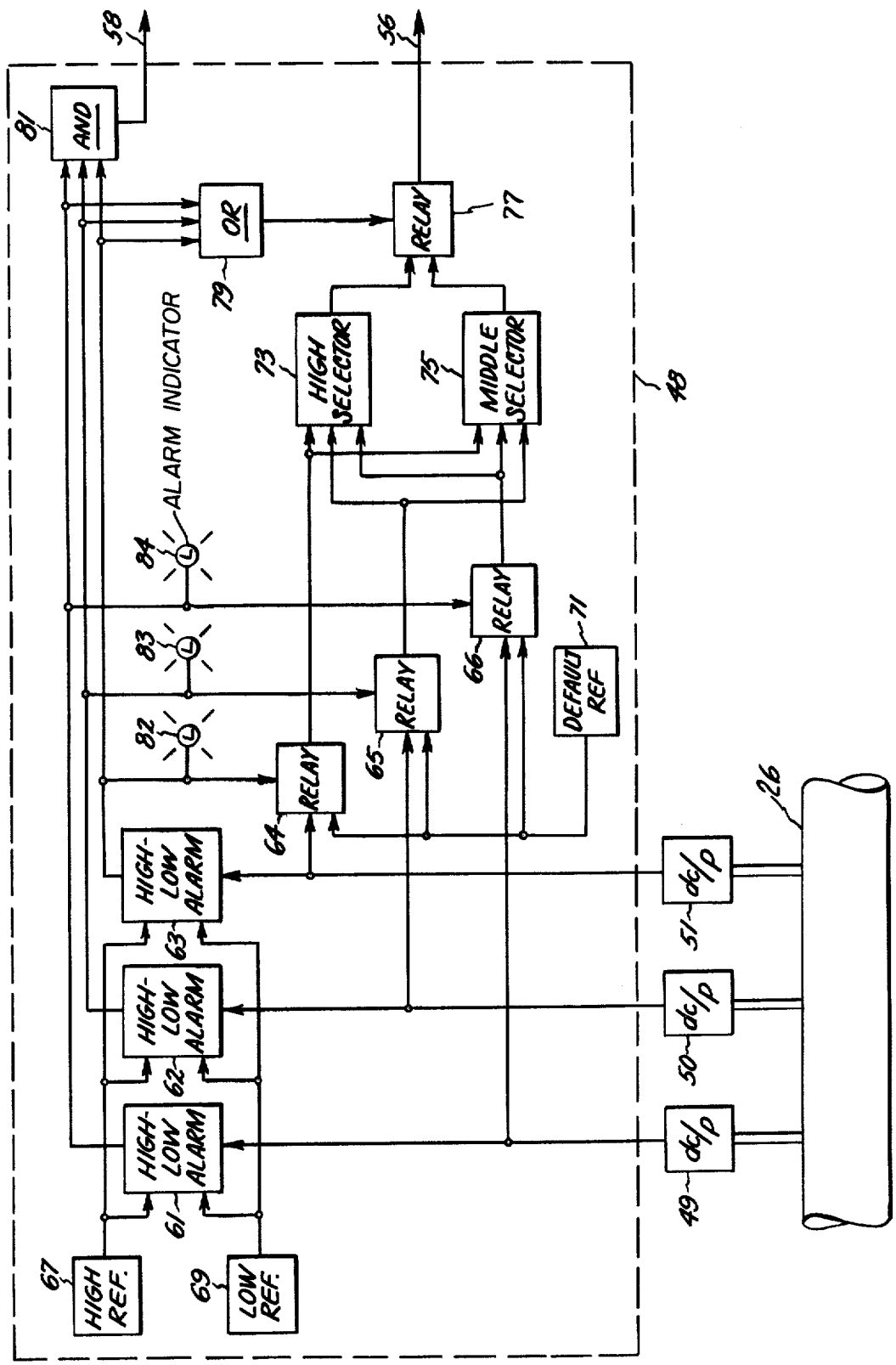
FIG. 2 is a detailed schematic illustration of the control signal selector of FIG. 1.

FIG. 2 presents a detailed diagram of the control signal selector 48 of FIG. 1. Elements common to both FIGS. 1 and 2 carry identical reference symbols. Redundant pressure sensors 49, 50, and 51 are all connected to provide or to generate an output electronic signal indicative of steam pressure in conduit 26. Each pressure signal is supplied to a corresponding high-low alarm circuit 61, 62, and 63; and to a corresponding relay or automatic switch, 64, 65, and 66. Each high-low alarm circuit, 61-63, provides an output alarm signal only when the corresponding input pressure signal is outside a preselected or predetermined range of values. The preselected range is determined by high reference value supplied to each alarm circuit by high reference source 67 and by a low reference value supplied by a low reference value source 69. The high and low reference values represent maximum and minimum acceptable values of actual steam pressure, respectively. The high-low alarm circuits 61-63 and the high and low reference sources 67 and 69 are conventional circuits, well known to those of ordinary skill in the art. For example, the alarm circuits may be configured of standard, commercially available comparator modules; the reference sources 67 and 69 may be regulated voltage sources, each preferably having an adjustable output.

Each relay 64-65 is adapted to receive a corresponding one of the alarm signals as a control signal and to become activated thereby. Thus, in the absence of a corresponding alarm signal a relay is inactive and passes to its output the pressure signal input from the corresponding pressure sensor 49, 50, or 51. However, upon becoming activated by the presence of an alarm signal, the relay (or relays) passes a default signal supplied by default reference source 71. The default signal represents a very low value of pressure. In a simple form, default reference 71 is merely circuit ground or a common reference point.

The output signal from each relay (either a pressure signal or the low valued default signal) is supplied to parallel connected high value selector 73 and middle value selector 75. These selector gates 73 and 75 will be more fully described herein below. Functionally, high value selector 73 selects the highest valued input signal (representing the highest steam pressure) as its output and middle selector 75 selects the intermediate pressure signal as its output. The highest pressure signal and the intermediate pressure signal are applied to a final relay or automatic switch 77 which then selects one or the other of these signals as the valid signal for control, depending on the status of the alarm signals. The alarm signal status in turn is determined by logical OR circuit 79 which activates relay 77 if any one of the alarm signals is present. It will be recognized at this point that it is generally preferable to have the intermediate valued signal selected for control purposes. Basing control on the middle value, when possible, minimizes the transient effect that would be caused by a slowly failing sensor whose output signal slowly drifts outside the prescribed range.

Actuation of relay 77 is an indication that at least one of the pressure signals is outside the preselected high-low range and the signal selected to be supplied to the controller via line 56 is the highest pressure signal remaining within the preselected range. That is, pressure signals in excess of the high reference value are automatically excluded by the action of at least one of the first relays, 64, 65, or 66. If none of the alarm signals are present to cause activation of relay 77, the control signal selected is the intermediate valued pressure signal. At times herein it may be convenient to refer collectively to relays 64–66, selectors 73 and 75, OR circuit 79, and final relay 77 as a selector network.

The turbine protection signal supplied to the controllers 36 and 46 of FIG. 1 via line 58 results from logical AND circuit 81 which produces an output signal only when alarm signals are received from all high-low alarm circuits 61–63. AND circuit 81 thus functions as a turbine protection network. Logic circuits, AND 81 and OR 79, are, of course, conventional, well-known circuit elements.

Each high-low alarm circuit 61–63 additionally activates an appropriate indicator 82, 83, and 84 whenever the corresponding pressure signal is outside the high-low range. Indicators 82–84 may be audible or visual devices or combinations thereof.

Figure 3:
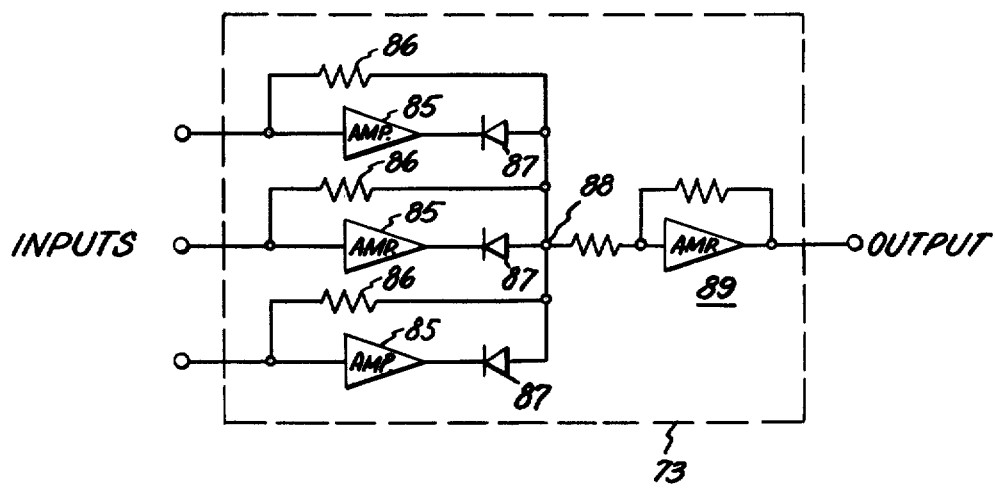
FIG. 3 is a circuit diagram of a high value gate useful in the control signal selector of FIGS. 1 and 2.
Figure 4:
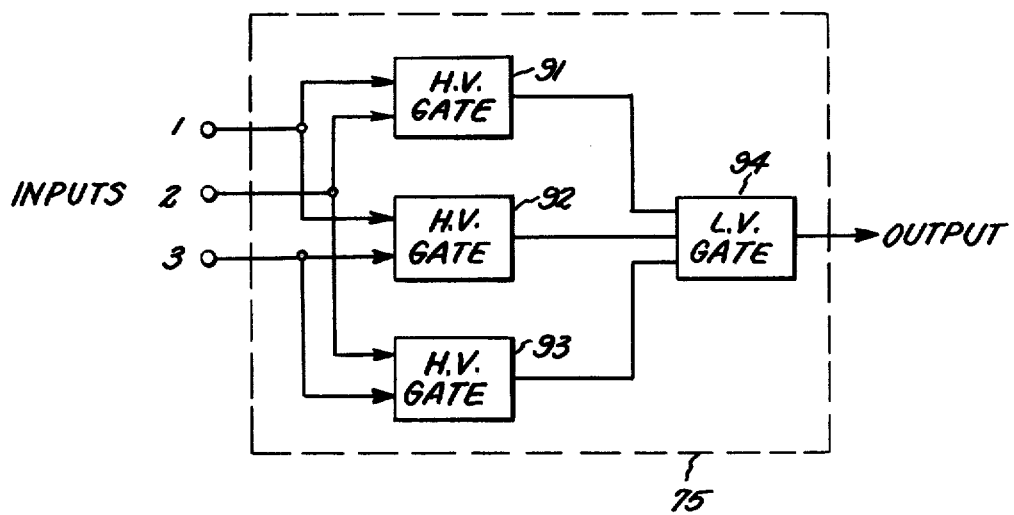
FIG. 4 is a block diagram illustration of a middle value selector, utilizing high and low value gates and useful in the control signal selector of FIGS. 1 and 2.

FIGS. 3 and 4 illustrate in further detail suitable circuit configurations for implementing high value gate 73 and middle selector 75, respectively, both of FIG. 2. In FIG. 3, amplifiers 85 along with feedback resistors 86 and diodes 87 cause the input signal of maximum amplitude to appear at junction 88. Inverting amplifier stage 89 reinverts the highest value signal to its original polarity and provides additional isolation. FIG. 4 is of a middle value gate for obtaining the intermediate value of three input signals and is comprised of high value gates 91, 92, and 93 of the type shown in FIG. 3 and of low value gate 94 which is implemented in similar fashion to the high value gate of FIG. 3 but with reversed connected and oppositely biased diodes. In FIG. 4, the lowest valued input signal is excluded immediately by the high value gates. The lowest remaining value is the intermediate valued signal of the three inputs and is selected by low value gate 94 as the output signal.

While there has been shown and described what is considered a preferred embodiment of the invention, it is understood that various other modifications may be made therein. For example, a signal selector as has been described can be implemented by suitably programming a computer or microprocessor-based controller and providing appropriate interfacing between the sensing transducers and the computing circuitry. Further, although the invention has been described in terms of selecting a pressure signal for controlling steam pressure, it will be apparent to those of ordinary skill in the art that virtually any measured, controlled parameter may be selected. For example, temperature, flow, or other variables may be selected as described. It is intended to claim all such modifications which fall within the true spirit and scope of the present invention.

What is claimed is:

1. In a control system for a steam turbine, an automatic signal selector for assuring selection of a valid signal representation of a controlled parameter, comprising:

a plurality of redundant sensing means, each providing a signal representation of a single controlled parameter and said plurality of sensing means providing redundant multiple signals of a single controlled parameter;

a plurality of range detection means, each detection means receiving a corresponding one of said controlled parameter signals and said detection means providing an alarm signal output whenever said corresponding controlled parameter signal is outside a preselected range of values; and a selector network receiving each said controlled parameter signal and each said alarm signal, and said network selecting, exclusive of any controlled parameter signals that may be outside said preselected range of values, an output signal which is the highest valued one of said controlled parameter signals whenever any one of said alarm signals is received or an intermediate valued one of said controlled parameter signals whenever none of said alarm signals is received, the controlled parameter signal thus selected being taken as a valid controlled parameter signal for turbine control.

2. The automatic signal selector as recited in claim 1 wherein said selector network further comprises:

a reference source providing a default signal equivalent to a preselected low value of said controlled parameter;

a plurality of first automatic switches, each switch receiving said default signal and a corresponding one of said controlled parameter signals as separate input signals and receiving a corresponding one of said alarm signals as a control signal, each such switch selecting said default signal or said corresponding controlled parameter signal as an output signal depending on whether said corresponding alarm signal is being received or not being received, respectively;

a high value gate receiving each output signal from said plurality of automatic switches and selecting as an output signal the highest valued one of such signals;

an intermediate value gate receiving each output signal from said plurality of automatic switches and said value gate selecting as an output signal an intermediate valued one of such signals;

a final automatic switch receiving the highest valued signal from said high value gate and the intermediate value signal from said intermediate value gate as separate input signals and receiving each separate alarm signal as control signals, said final automatic switch selecting said highest valued signal or said intermediate value signal as said valid signal for turbine control depending on whether at least one of said alarm signals is being received or none of said alarm signals is being received, respectively.

3. The automatic signal selector as recited in claims 1 or 2 further including a turbine protection network receiving each said alarm signal and providing a protective action output signal whenever all alarm signals are received simultaneously, said protective action signal representing the condition wherein all controlled parameter signals are outside said preselected range of values.

4. The automatic signal selector as recited in claim 3 further including a plurality of indicator means, each indicator receiving a corresponding one of said alarm signals and providing an indication to operating personnel that a corresponding one of said control parameter signals is outside said preselected range.

5. In combination with a control system for a steam turbine, a signal selector for assuring selection of a valid signal representation of a controlled parameter, comprising:
   a trio of redundant sensors, each providing a signal representation of a single controlled parameter, and said trio of sensors providing redundant multiple signals of a single controlled parameter;
   a trio of range detectors, each receiving a corresponding one of said controlled parameter signals and providing an alarm signal whenever said corresponding controlled parameter signal is outside a preselected range of controlled parameter values; and
   a selector network receiving each controlled parameter signal and each alarm signal, said selector network selecting as an output signal the highest valued control parameter signal, exclusive of any such signal that is outside said preselected range of values, whenever any one of said alarm signal is received or selecting the middle valued control parameter signal whenever none of said alarm signals is received, the signal thus selected being taken as a valid signal for control.

6. The combination as recited in claim 5 wherein said selector network includes:
   a reference source providing a default signal equivalent to a preselected low value of said controlled parameter;
   a trio of first automatic switches, each receiving said default signal and a corresponding one of said controlled parameter signals as separate input signals and receiving a corresponding one of said alarm signals as a control signal, each automatic switch selecting said default signal or said corresponding controlled parameter signals as an output signal depending on whether said corresponding alarm signal is being received or not being received, respectively;
   a high value gate receiving each output signal from said trio of automatic switches and selecting as an output signal the highest valued one of such signals;
   a middle value gate receiving each output signal from said trio of automatic switches and selecting as an output signal the middle valued one of such signals;
   a final automatic switch receiving the highest valued signal from said high value gate and the middle valued signal from said middle value gate as separate input signals and receiving each said alarm signal as control signals, said final automatic switch selecting said highest valued signal or said middle valued signal as said valid signal for turbine control depending on whether at least one of said alarm signals is being received or none of said alarm signals is being received, respectively.

7. The combination as recited in claim 6 further including a logical AND network providing a protective action signal whenever all alarm signals are simultaneously received by said AND network, said protective action signal representing a condition wherein all controlled parameter signals are outside said preselected range of values.

8. The combination as recited in claim 7 further including a trio of indicators, each responsive to a corresponding one of said alarm signals to provide a perceptible indication that a corresponding one of said controlled parameter signals is outside said preselected range.

9. In a control system for a steam turbine, an automatic redundant transducer selector for selecting, and applying at its output, a valid signal which is representative of the steam pressure at a particular location in the steam path of said steam turbine, said automatic transducer selector comprising:
   three redundant pressure transducers, said transducers including means for sensing the pressure at substantially the same location in said steam path of said steam turbine and means for generating three independent pressure signals at their outputs;
   three range detection means, each detection means having its input connected to a single transducer output, and each detection means including means for generating an alarm signal at its output whenever its respective pressure signal input is outside a predetermined range of values; and
   a selector network having means for receiving each pressure signal and each alarm signal, said selector network including means for applying, at its output, either the intermediately valued pressure signal of said three transducers when no alarm signal is applied at its inputs, or the highest valued pressure signal of all the pressure signals which are within said predetermined range of values when one or more alarm signals are applied at its inputs, said network having means for excluding from selection all pressure signals which have a corresponding alarm signal associated therewith, such that the pressure signal selected is a valid pressure signal useful for controlling said steam turbine.

10. In a control system for a steam turbine, an automatic redundant transducer selector for selecting one valid output signal from three input signals, said input signals being representative of a controlled parameter sensed at a particular location in the steam turbine, said automatic transducer selector comprising:
   three redundant transducers, said transducers having means for sensing only one controlled parameter at substantially the same location in said steam turbine and means for generating three independent input signals;
   three range detection means, each detection means having a single input signal supplied thereto, and each detection means having means for generating an alarm signal whenever its respective input signal is outside a predetermined range of values; and
   a selector network having means for receiving each input signal and each alarm signal, said selector network including means for selecting one valid output signal from either the intermediately valued input signal of said three input signals when no alarm signal is received by said network, or the highest valued input signal of all input signals which are within said predetermined range of values when one or more alarm signals are received by said network, said network having means for excluding from selection all input signals which are received with a corresponding alarm signal, whereby the input signal so selected is a valid output signal useful for controlling said steam turbine.

* * * * *